United States Patent
Boye

(10) Patent No.: US 10,788,807 B2
(45) Date of Patent: Sep. 29, 2020

(54) METHOD FOR COMPENSATING MILLING CUTTER DEFLECTION

(71) Applicant: DR. JOHANNES HEIDENHAIN GmbH, Traunreut (DE)

(72) Inventor: Tim Boye, Waging am See (DE)

(73) Assignee: DR. JOHANNES HEIDENHAIN GMBH (DE)

(*) Notice: Subject to any disclaimer, the term of this patent is extended or adjusted under 35 U.S.C. 154(b) by 169 days.

(21) Appl. No.: 15/960,240

(22) Filed: Apr. 23, 2018

(65) Prior Publication Data

US 2018/0307200 A1 Oct. 25, 2018

(30) Foreign Application Priority Data

Apr. 25, 2017 (DE) .......................... 10 2017 206 931

(51) Int. Cl.
*G05B 19/404* (2006.01)
*G05B 19/19* (2006.01)
(Continued)

(52) U.S. Cl.
CPC .............. *G05B 19/404* (2013.01); *B23C 1/16* (2013.01); *B23C 5/26* (2013.01); *G05B 19/19* (2013.01);
(Continued)

(58) Field of Classification Search
CPC .. G05B 19/404; G05B 19/19; G05B 19/4063; G05B 2219/49173; G05B 2219/49174;
(Continued)

(56) References Cited

U.S. PATENT DOCUMENTS 3,602,090 A * 8/1971 Whetham ............ G05B 19/404
409/239
3,728,595 A * 4/1973 Adams .................. B23Q 17/00
318/39
(Continued)

FOREIGN PATENT DOCUMENTS

CN 101434045 B * 6/2010
DE 10305196 A1 8/2004
(Continued)

OTHER PUBLICATIONS

European Search Report issued in European Patent Application No. 18 15 3492, dated Aug. 15, 2018 (2 pages total).

*Primary Examiner* — Christopher E. Everett
(74) *Attorney, Agent, or Firm* — Carter, DeLuca & Farrell LLP

(57) ABSTRACT

A method for compensating for the deflection of a milling cutter during the machining of a workpiece by a numerically controlled machine tool having a plurality of axes includes: executing a learning cut on a test workpiece having a known geometry by the milling cutter mounted on a tool spindle in a climb milling mode, and in doing so, ascertaining a correlation between a quantity that is proportional to the torque of the drive of the tool spindle and the deflection of the milling cutter normal to a surface of the test workpiece, the deflection being determined by comparing the actual contour of the test workpiece to a setpoint contour. This is followed by storing of the correlation for the milling cutter and machining of the workpiece by the milling cutter in a climb milling mode, while utilizing the stored correlation for compensating for the deflection of the milling cutter by applying a positional correction that is proportional to the quantity to a setpoint position of the axes of the machine tool.

22 Claims, 3 Drawing Sheets

(51) Int. Cl.
  *G05B 19/4063* (2006.01)
  *B23C 1/16* (2006.01)
  *B23C 5/26* (2006.01)

(52) U.S. Cl.
  CPC .............. *G05B 19/4063* (2013.01); *G05B 2219/32049* (2013.01); *G05B 2219/32187* (2013.01); *G05B 2219/37374* (2013.01); *G05B 2219/49173* (2013.01); *G05B 2219/49174* (2013.01); *G05B 2219/49181* (2013.01); *G05B 2219/49186* (2013.01)

(58) Field of Classification Search
  CPC .......... G05B 2219/49181; G05B 2219/49186; G05B 2219/32187; G05B 2219/32049; G05B 2219/37374; B23C 1/16; B23C 5/26
  See application file for complete search history.

(56) References Cited

U.S. PATENT DOCUMENTS

| | | | | |
|---|---|---|---|---|
| 3,784,798 A * | 1/1974 | Beadle | ............... | G05B 19/4163 700/173 |
| 5,319,357 A * | 6/1994 | Diei | ............... | G01H 1/003 340/680 |
| 6,065,338 A * | 5/2000 | Stoiber | ............... | F16F 15/36 73/462 |
| 6,184,644 B1 * | 2/2001 | Eguchi | ............... | G05B 19/404 318/624 |
| 6,384,560 B1 * | 5/2002 | Kakino | ............... | G05B 19/404 318/433 |
| 7,804,204 B1 * | 9/2010 | Shafer | ............... | B23D 59/001 307/326 |
| 8,093,856 B2 | 1/2012 | Miyaji | | |
| 10,168,248 B1 * | 1/2019 | Morey | ............... | G01M 13/021 |
| 2004/0179915 A1 * | 9/2004 | Hill | ............... | B23Q 17/0971 409/131 |
| 2006/0253220 A1 * | 11/2006 | McPherson | ............... | B24B 13/005 700/176 |
| 2007/0016325 A1 * | 1/2007 | Esterling | ............... | B23Q 17/0961 700/175 |
| 2008/0105094 A1 * | 5/2008 | McMurtry | ............... | B23Q 15/12 82/118 |
| 2010/0087949 A1 * | 4/2010 | Coleman | ............... | G05B 19/40937 700/189 |
| 2010/0109594 A1 * | 5/2010 | Miyaji | ............... | G05B 19/19 318/632 |
| 2011/0163221 A1 * | 7/2011 | Hasebe | ............... | B23Q 15/22 248/637 |
| 2012/0194121 A1 * | 8/2012 | Miyaji | ............... | G05B 19/404 318/615 |
| 2013/0064619 A1 * | 3/2013 | Belmonte | ............... | B23C 3/30 409/132 |
| 2016/0056736 A1 * | 2/2016 | Eguchi | ............... | H02P 5/50 318/625 |
| 2016/0098031 A1 * | 4/2016 | Ikai | ............... | G05B 19/404 700/95 |
| 2016/0274563 A1 * | 9/2016 | Eguchi | ............... | G05B 19/19 |
| 2016/0332245 A1 * | 11/2016 | Kurohara | ............... | B23H 7/06 |
| 2017/0090453 A1 * | 3/2017 | Endou | ............... | B23C 3/00 |
| 2018/0039252 A1 * | 2/2018 | Kohler | ............... | G05B 19/406 |
| 2018/0181108 A1 * | 6/2018 | Nagano | ............... | G05B 13/0265 |
| 2018/0297133 A1 * | 10/2018 | Seehuus | ............... | B23D 47/00 |

FOREIGN PATENT DOCUMENTS

DE   102005012105 A1   9/2006
KR   20130042140 A     4/2013

* cited by examiner

METHOD FOR COMPENSATING MILLING CUTTER DEFLECTION

CROSS-REFERENCE TO RELATED APPLICATIONS

The present application claims priority to Application No 10 2017 206 931.7, filed in the Federal Republic of Germany on Apr. 25, 2017, which is expressly incorporated herein in its entirety by reference thereto.

BACKGROUND INFORMATION

The present invention relates to a method for compensating for the deflection of a tool during the milling of a workpiece. The method utilizes quantities that are processed in a numerical control and does not require a special sensor for carrying out the compensation.

BACKGROUND INFORMATION

During the machining of a workpiece using a numerically controlled machine tool, a rotating milling cutter is moved through the workpiece according to the specifications of a machining program. Material is removed in the process until the workpiece has the desired shape. Considerable process forces occur during the machining, which lead to a deformation of the never completely rigid system that includes the machine tool, the clamping, and the tool so that deviations effectively exist between the programmed and the actual shape of the workpiece.

A particularly critical component of the process force (in particular in the case of slab milling in which the milled flank is produced by an end mill) is the deflection force that acts perpendicular to the axis of rotation of the milling cutter and extends perpendicular to the programmed path of the milling cutter, or normal to the machined surface. This deflection force results in deflection or a deflection of the milling cutter. Deflections from the setpoint path of the milling cutter as a result of the deflection force directly lead to contour errors. There exist conventional methods for compensating for this milling-cutter deflection For example, a compensation of the milling-cutter deflection may be carried out by measuring the deviations on the finished workpiece and then taking the deviations into account for future workpieces in a modified machining program. However, this produces rejects and is quite time-consuming, which is not justifiable in particular when individual pieces or a low-volume production is/are involved. In addition, this procedure has to be repeated for each new workpiece.

German Published Patent Application No. 103 05 196 describes the use of control-internal quantities for inferring deviations in the production process and a direct compensation of such deviations during the machining in that correction values for the axial positions of a machine tool are ascertained on the basis of the control-internal quantities.

SUMMARY

Example embodiments of the present invention provide a method for compensating for the deflection of a milling cutter, which exploits a correlation between a quantity processed in the numerical control and the deflection of the milling cutter from its setpoint path, and which allows for a compensation of the milling-cutter deflection in an uncomplicated manner and for a broad range of possible application cases.

According to an example embodiment of the present invention, a method for compensating for the deflection of a milling cutter during the machining of a workpiece by a numerically controlled machine tool having multiple axes, includes: executing a learning cut on a test workpiece having a known geometry using climb milling with the aid of the milling cutter mounted on a tool spindle; in the process, ascertaining a correlation between a quantity that is proportional to the torque of a drive of the tool spindle and the deflection of the milling cutter in a direction normal to a surface of the test workpiece, the deflection being determined by comparing the actual contour of the test workpiece to a setpoint contour. This is followed by storing of the correlation for the milling cutter and by the machining of the workpiece by the milling cutter in a climb milling mode. The stored correlation is used for compensating for the deflection of the milling cutter in that a positional correction that is proportional to the quantity is applied to a setpoint position of the axes of the machine tool.

The reason for this is that the deflection force is in broad ranges directly proportional to the torque that the drive of the tool spindle has to apply while machining a workpiece in the climb milling mode. The torque and the force normal to the workpiece surface increase to the same extent as the pressure angle of the milling cutter. The assumption of a linear correlation between the torque and the deflection force for a pressure angle of approximately 0° to 140° provides sufficiently good results in the compensation of deflection of the milling cutter. The force that displaces the milling cutter is roughly independent of the plunging depth of the milling cutter.

The deflection force and the deflection or deflection of the milling cutter from its setpoint path are directly proportional in accordance with Hooke's law, and the constant of proportionality (spring constant) results from the resiliencies of the respective axes, the tool, the clamping, and the machined workpiece. If the resiliencies of the clamping and the workpiece are sufficiently low, it will suffice to determine the machine-specific resiliencies of the axles and the tool only once and to take the resiliency into account when compensating for the deflection.

Since the torque of the drive of the tool spindle is not directly ascertainable without a considerable investment in special sensors, quantities that are proportional to the torque and are available to the numerical control may be considered. Such quantities include values or parameters that are internally ascertained and processed by the control or which are supplied by external sensors such as position-measuring devices. For example, the quantities are used in control loops of the numerical control.

One such quantity, for instance, is the current that is flowing into the drive motor of the tool spindle; in a field-oriented control of the motor, the torque-generating component of the current must be examined. If this current is tapped in a numerical control as the quantity that is proportional to the torque, then the current should be reduced by the pilot-control current of the control loop because it usually overcomes the friction in the spindle drive that is of negligible importance for the deflection, and/or modifies the torque in a predictive manner when acceleration processes are imminent.

To allow the use of the quantity that is proportional to the torque for compensating for the deflection, the linear correlation between this quantity and the deflection force or the deflection has to be determined with the aid of a learning cut, e.g., for each milling cutter on a particular machine tool and for each affected axial direction. The correlation corresponds to a linear slope in each case. For workpieces and clamping arrangements of sufficient stability, a deflection compensation for the respective axial direction will then be implementable. This is accomplished by multiplying the quantity by the respective milling-cutter-specific and axis-specific linear slope, and by applying the deflection obtained in this manner to the setpoint positions of the axes as a correction.

For example, linear slopes ascertained with the aid of the learning cut may be stored in the tool table of the machine tool, where other tool-specific parameters such as the milling-cutter radius and the milling-cutter length are stored as well.

The no-load current of the tool spindle during the learning cut should also be ascertained and stored. The current ascertained during a machining operation should be reduced by this no-load current because it substantially overcomes only the friction in the spindle drive. If the pilot control of the spindle current is working effectively, then the current reduced by the pilot current may actually be 0 during idling, but if the pilot control fails to fully acquire the friction or if no pilot control of the current takes place at all, then the ascertainment and the use of the no-load current considerably improves the result of the compensation.

In addition to the no-load current during the learning cut, the rotational speed during the learning cut should also be stored in the tool table. The deflection force is a function of the rotational speed, which is why the learning cut and the later machining of a workpiece should take place at an approximately identical rotational speed. The numerical control should therefore ensure compliance with this condition or at least output a warning if the actual rotational speed excessively deviates from the rotational speed of the learning cut. The same consideration also applies to the forward-feed rate of the milling cutter during the learning cut. The rotational speed and the forward-feed rate should therefore be stored in the form of marginal conditions.

The correlation used in this instance applies only to machining in a climb milling mode, which is described below. In the event that a machining simulation is running on the numerical control, as is often the case, e.g., for the output of a simulation graphic of the machining, the control may utilize the position of the milling cutter, the workpiece, the movement direction of the axes, and the direction of rotation of the tool spindle in order to determine whether climb milling is being performed and to activate a compensation only if this is the case. A simulation that is able to distinguish between climb milling and up-cut milling does not require great computing power. Alternatively, when setting up the machining program (part program), it should be ensured that the machining always (or only if particularly critical surfaces are involved) takes places in the form of climb milling.

By itself, the current of the spindle drive does not contain any information as to the direction in which the deflection is acting. However, if climb milling is assumed and if the direction of rotation of the spindle is known and the movement direction of the involved axes, then the direction of the deflection is able to be calculated from the cross product of the direction-influenced (sense of rotation) milling-cutter axis and the forward-feed direction. The required information is available at all times in a numerical control.

In machine tools without pivot axes, the forward-feed direction is usually located in the X-Y plane, and the milling-cutter axis is arranged in parallel to the Z-direction, perpendicular to the X-Y plane. The deflection force is also located in the X-Y plane and is able to be compensated for by the X- and Y drives. In the case of machine tools having pivot axes, the spindle axis must first be converted into the machine-coordinate system in order to then be able to calculate the direction of the deflection using the cross product, and to compensate for it.

Further features and aspects of example embodiments of the present invention are described in more detail below with reference to the appended Figures.

DETAILED DESCRIPTION

To begin with, the positive effect of the method according to example embodiments of the present invention for compensating for the deflection of the milling cutter is described with reference to FIGS. 1 and 2.

Figure 1:
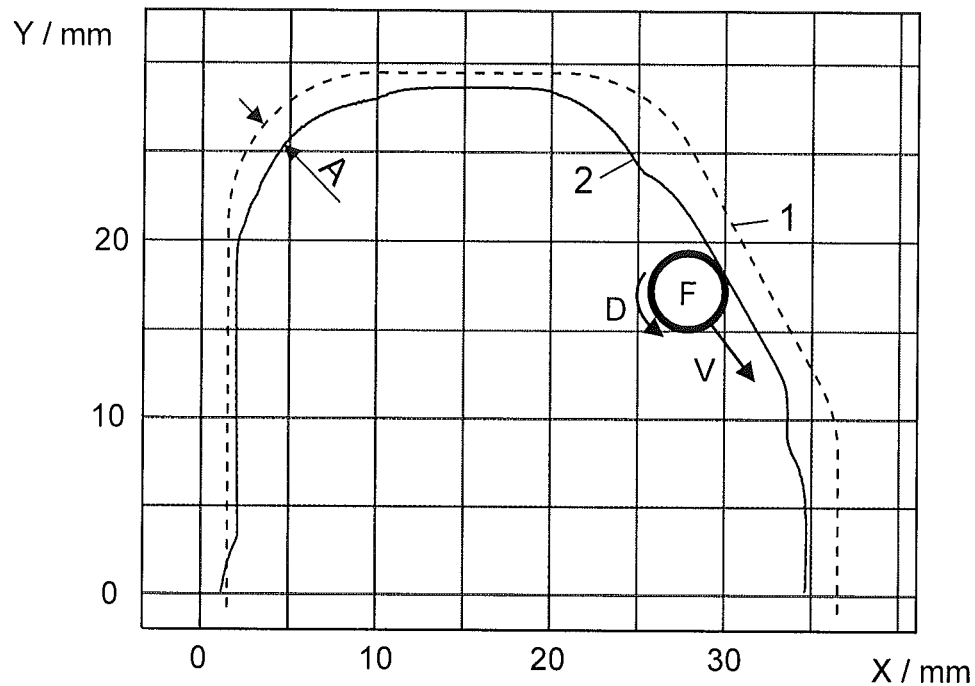
FIG. 1 schematically illustrates milling-cutter deflection without compensation.

FIG. 1 shows the result of the machining of a workpiece in the X-Y plane by the X- and Y-axes of a three-axis machine tool. In the process, a pocket is cleared out with the aid of a milling cutter F operated in a climb cutting mode. Shown are forward-feed direction V and direction of rotation D of milling cutter F. Programmed setpoint contour 1 and actually obtained actual contour 2 of the pockets clearly deviate from each other. For example, actual contour 2 is able to be detected by a measuring or switching touch probe subsequent to the machining operation. Shown in this instance is deviation A from setpoint contour 1 featuring a 25-fold exaggeration. Maximum milling-cutter deflection A amounts to up to 135 μm in FIG. 1. Such deviations are not unheard of in practice given typical rigidities of 10 to 30 N/μm of a machine tool. In particular, corners and other regions featuring rapidly changing process forces are critical in this context. Visible marks may be created on the workpiece surface.

Figure 2:
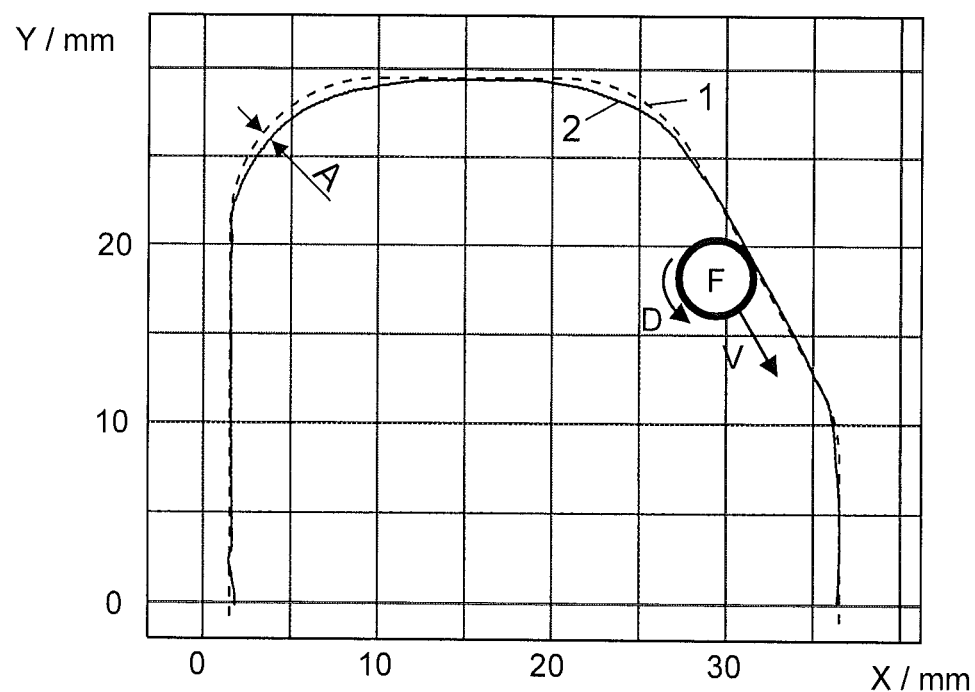
FIG. 2 schematically illustrates milling-cutter deflection with compensation.

In the machining illustrated by FIG. 2, the same machining program and the same milling cutter F as in FIG. 1 is used, but the method for compensating for deflection A of milling cutter F is activated in addition. It is apparent that maximum deflection A of milling cutter F is considerably reduced, i.e., to a value of maximally 33 μm. Maximum deflection A is therefore reduced by approximately a factor of 5, and setpoint contour 1 and actual contour 2 coincide in substantial regions.

Figure 3:
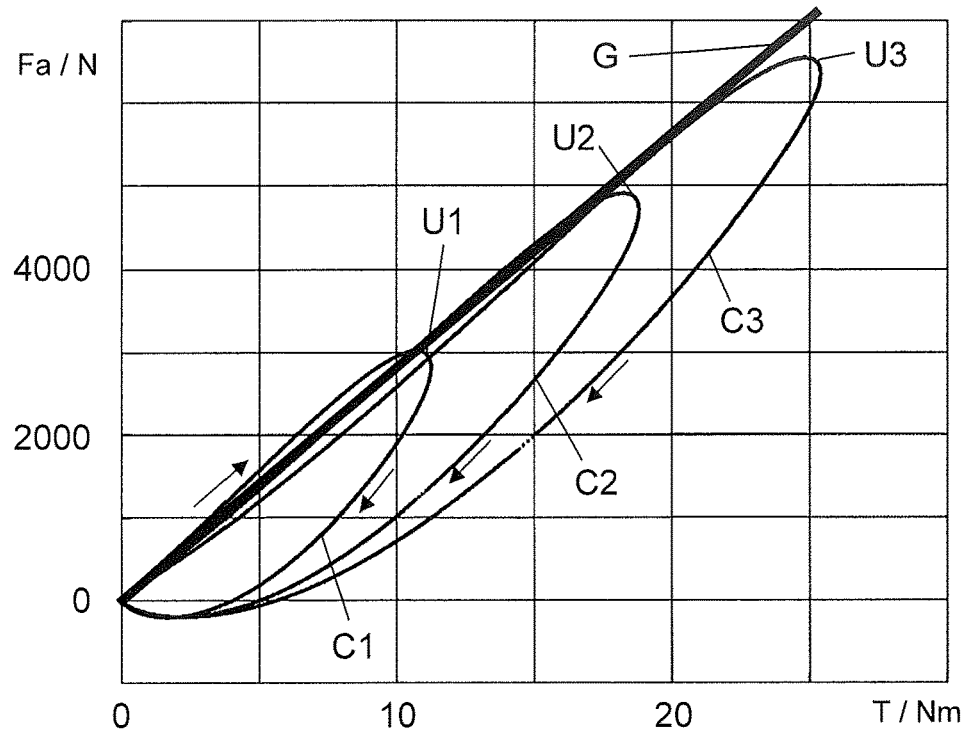
FIG. 3 schematically illustrates correlation between the torque of a drive of a tool spindle and the displacement force that is acting on the milling cutter.

FIG. 3 illustrates the correlation between torque T of the spindle drive of a machine tool to be generated during the milling operation and force Fa (deflection force Fa) which is displacing the milling cutter, the correlation being shown for different cutting conditions.

Three different cuts C1, C2, C3 at an increasing tooth-forward feed (C1: 0.08 mm, C2: 0.17 mm, C3: 0.25 mm) are provided. Each cut C1, C2, C3 begins and ends in the origin of the diagram. From the beginning of the cut C1, C2, C3 to the respective reversal point U1, U2, U3, the pressure angle of the milling cutter increases from 0° to 180°. Each cut up to reversal point U1, U2, U3 is carried out in a climb milling mode, and then in the form of up-cut milling until the starting point is reached again.

A region in which all three cuts C1, C2, C3 are roughly on a common straight line G can be seen. However, this approximation applies only to climb milling, i.e. for a pressure angle of 0° to approximately 140° in each case. No such region featuring a common linear slope exists in up-cut milling.

Deflection force Fa thus exhibits a behavior that is approximately proportional to torque T of the drive of the tool spindle in this region. Since deflection A of milling cutter F is again proportional to deflection force Fa due to Hooke's law, deflection A is also proportional to torque T of the drive of the tool spindle under the mentioned conditions (pressure angle 0° to 140° in a climb milling mode). The method described herein exploits this approximately linear correlation which is independent of other process conditions.

However, since it is not easy to directly access this torque T, the drive current, or certain components of this drive current that are easily determinable, are utilized in this exemplary embodiment as quantities that are proportional to torque T in order to serve as the starting point for the compensation of deflection A. These components of the drive current are available as control-internal quantities within a numerical control. A method for compensating for the milling-cutter deflection A that is performed in the form of software in a numerical control can readily access these quantities. Only the proportionality factor will be required, which—when multiplied by the control-internal quantity—makes it possible to calculate deflection A to be compensated.

Figure 4:
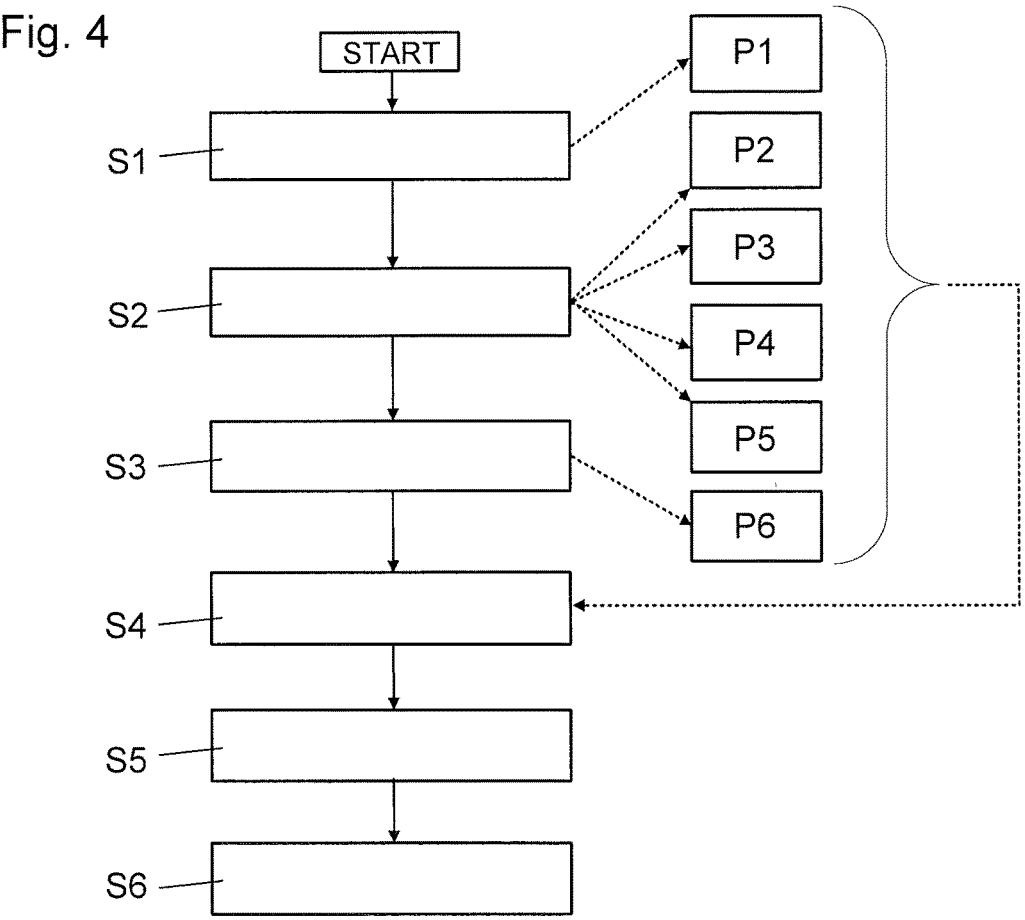
FIG. 4 schematically illustrates a compensation method.
Figure 5:
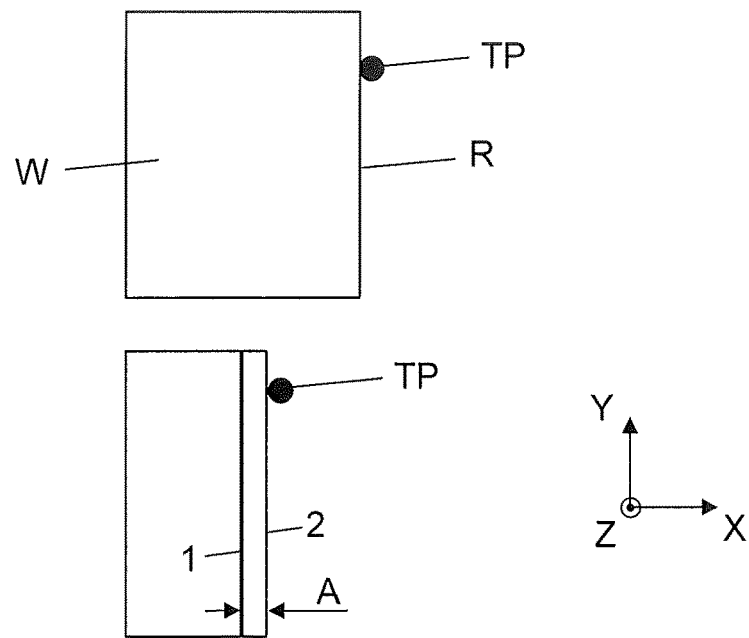
FIG. 5 schematically illustrates a learning cut on a side.
Figure 6:
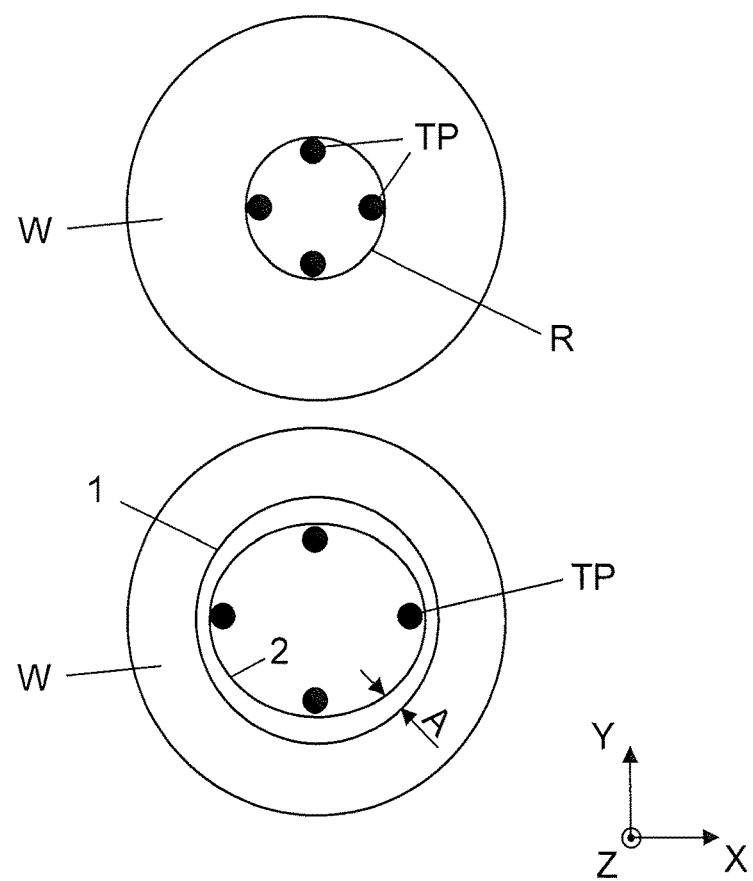
FIG. 6 schematically illustrates a learning cut in a circular pocket.

Referring to FIGS. 4, 5 and 6, it will be explained how to find the quantities required for the compensation, and, in particular, the proportionality factor between the relevant drive current and deflection A to be corrected. The simple case of a numerically controlled machine tool which has three linear axes is assumed; its milling cutter F is aligned in the Z-direction and is able to be moved in the X- and Y-direction at an adjustable infeed (along the Z-direction). The compensation of deflection A has to be carried out by applying positional corrections for each of the two directions X, Y. The resiliency of the machine tool may differ in the respective directions X, Y so that a separate proportionality factor has to be ascertained for each axis X, Y. More complex machine architectures with additional axes entail the ascertainment of further proportionality factors and also the conversion of tilted spindle axes into the machine-coordinate system.

The steps for preparing the compensation are described below with reference to FIG. 4. The steps may partly be reconstructed on the basis of FIGS. 5 and 6.

After the method has been started, a touch probe TO measures a reference area R of a test workpiece W in a first step S1. In FIG. 5, this reference area R is located parallel to the Y-Z plane, and the position of reference area R in the X-direction is ascertained through touch. This position of reference area R prior to the actual learning cut is recorded as a first parameter P1.

In a second step S2, a learning cut by which a setpoint contour 1 is to be produced is then performed, and the feed-forward rate and the spindle speed at which the learning cut is carried out is recorded in connection with this learning step. This marginal condition of the learning cut is recorded as a second parameter P2. In addition, immediately prior to or after the learning cut, the no-load current of the spindle is obtained and stored as a third parameter P3. The load current during the learning cut is stored as a fourth parameter P4. This load current P4 may be ascertained as described above. It is possible to use the spindle current reduced by no-load current P3 or, in a field-oriented control, the torque-forming spindle current reduced by no-load current P3, and/or reduced by the pilot-control current. To the greatest extent possible, load current P4 should correspond to torque T generated for the milling operation. To improve the compensation of deflection A, it may be provided to filter certain frequency ranges when determining load current P4 so that the current signal can be smoothed. For example, the rotational frequency of milling cutter F, the tooth-engagement frequency, or the current noise may be stripped from load current P4.

Stored as a fifth parameter P5 is the infeed in the X-direction, which results from the position of reference area R and setpoint contour 1. Without deflection A, actual contour 2 should correspond to setpoint contour 1 following the learning cut.

After the learning cut in second step S2, actual contour 2 is measured in third step S3 with the aid of touch probe TP. The difference between setpoint contour 1 and actual contour 2 results in deflection A of milling cutter F, which is stored as a sixth parameter P6.

In fourth step S4, the results up to this point are analyzed. For load current P4, which is ascertained in second step S2, a corresponding deflection A of milling cutter F is determined. Since straight line G in FIG. 3 passes through the origin, a slope may thereby be ascertained, which allows for an approximate calculation of deflection A for each load current P4. As is illustrated with reference to FIG. 3, this slope applies to machining in a climb milling mode at a pressure angle in the range of 0° to approximately 140°.

In a fifth step S5, the ascertained results are stored such that they are available during subsequent machining of a workpiece. Since the ascertained slope is tool-specific, the tool table, in which many parameters of each tool provided on the machine tool are stored, may be suitable for this purpose. These parameters, for example, are the tool type and the geometrical dimensions of the tools such as the length and the radius of an end milling cutter F. As a result, this tool table additionally stores the slope of straight line G ascertained in fourth step S4, e.g., as a function of the direction for each machine axis X, Y. Storing of marginal conditions P2 of the learning cut may also be provided so that at least similar conditions can be observed during the real machining. It is also possible to perform a plurality of learning cuts for a milling cutter F under different marginal conditions P2 (e.g., when finishing and roughing) and to store and manage them in the tool table so as to be able to calculate suitable deflections A for these different marginal conditions P2. A shared dataset of linear slope and marginal conditions may also suffice for milling cutters F that are considered to be similar.

FIG. 6 shows an alternative to the learning cut of FIG. 5. While the learning cut from FIG. 5 makes it possible to determine the slope of straight line G only for an individual axial direction X (which is why the learning cut must be repeated for each axial direction X, Y), the learning cut of FIG. 6 makes it possible to ascertain the slope of the straight line for two axial directions X and Y. To do so, a circular pocket is produced as reference area R in first step S1. The measuring of a reference area R may also be omitted in this case if the pocket is milled into an initially closed surface.

Setpoint contour 1 of the pocket is circular. It is apparent from the deviation of actual contour 2 from setpoint contour 1 that deflection A for the Y-direction is greater than deflection A in the X-direction in this particular example. As a result, different slopes will result for straight lines G of the respective axis X, Y.

After all required preconditions for a compensation of deflection A are created with the aid of steps S1 to S5, the compensation is able to be used in the real machining of a workpiece in a sixth step S6. Presuming climb milling and compliance with marginal conditions P2 of the learning cut within a predefined tolerance range, it is possible to multiply load current P4 by the slope ascertained for each axial direction (e.g., the constant of proportionality) during the machining, and to add the value of deflection A obtained in this manner to the setpoint position of milling cutter F as a correctional offset. The direction of deflection A, which is able to be ascertained using the cross product of the direction of forward feed V and direction of rotation D of milling cutter F, must be taken into account in the process. Deflection A is therefore oriented perpendicular to the side of the workpiece produced with the aid of milling cutter F.

It is initially possible to activate the compensation as a matter of principle and to actually use it, such as via an automated detection of the climb milling mode, whenever a simulation of the machining running in parallel detects a climb milling operation. Such a simulation need not be particularly precise and often already runs parallel to the machining in numerical controls for the purpose of visualizing the process. Alternatively, it is possible to watch for machining in the climb milling mode at critical points in a machining program and to then specify the use of the compensation in the machining program.

If the compensation is turned on, the numerical control should ensure that marginal conditions P2 of the learning cut are observed to a certain extent because only then will the slope used for the compensation produce excellent results. If the deviation is too large, the numerical control is able to output a corresponding warning.

It is assumed that the resiliencies of the clamping and the workpiece are sufficiently small in comparison with the elasticities of machine axles X, Y and milling cutter F. The once determined correlation between load current P4 and deflection A may then be used for different workpieces.

However, for special clampings or special workpieces, the respective resiliencies may also play a more important role. The method for ascertaining the correlation between load current P4 and deflection A described above may then be repeated on this clamping and on this workpiece, and the correlation for the special application be ascertained, stored, and subsequently applied.

The described compensation of deflection A makes it possible to compensate for deflection forces Fa that increase over time due to the wear of milling cutter F since a higher load current P4 flows due to wear and a correspondingly greater offset is therefore ascertained for the compensation of deflection A.

What is claimed is:

1. A method for compensating for deflection of a milling cutter during processing of a workpiece by a numerically controlled machine tool having a plurality of axes, comprising:
    performing a learning cut on a test workpiece having a known geometry using the milling cutter mounted on a tool spindle in a climb milling mode;
    ascertaining a linear correlation between a quantity that is proportional to torque of a drive of the tool spindle and the deflection of the milling cutter normal to a surface of the test workpiece, the deflection being determined by comparing an actual contour of the test workpiece to a setpoint contour;
    storing the linear correlation for the milling cutter; and
    machining the workpiece by the milling cutter using the climb milling mode, and utilizing the stored linear correlation in order to compensate for the deflection of the milling cutter by applying a positional correction that is proportional to the quantity to a setpoint position of the axes of the machine tool.

2. The method according to claim 1, wherein the performing of the learning cut and/or the ascertaining of the linear correlation includes measuring the test workpiece with the aid of a touch probe.

3. The method according to claim 1, wherein the performing of the learning cut includes storing a rotational speed and/or a forward feed speed of the milling cutter used for the learning cut as a marginal condition, and wherein the machining of the workpiece includes monitoring the marginal condition.

4. The method according to claim 1, further comprising detecting and/or forcing, in accordance with simulation and/or programming, a climb milling mode.

5. The method according to claim 1, wherein the quantity that is proportional to the torque of the drive of the tool spindle includes a load current of the drive ascertained during the learning cut.

6. The method according to claim 5, wherein a current flowing in the drive of the tool spindle during the learning cut, reduced by a no-load current and/or by a pilot-control current of the drive, is stored as the load current.

7. The method according to claim 5, wherein, in a field-oriented control of the drive, a torque-forming current of the drive, reduced by a no-load current and/or by a pilot-control current of the drive, is stored as the load current.

8. The method according to claim 1, further comprising filtering the quantity to reduce interfering frequency components.

9. The method according to claim 8, wherein frequency components of the rotational speed of the milling cutter correspond to a tooth-engagement frequency and/or current noise.

10. The method according to claim 1, wherein the linear correlation is stored in the storing step as a linear slope in a tool table of the machine tool.

11. The method according to claim 1, wherein a pressure angle of the milling cutter during the machining of the workpiece is between 0° and 140°.

12. A system, comprising:
    a numerical control for a machine tool having a plurality of axes, wherein the numerical control is adapted to perform a method for compensating for deflection of a milling cutter during processing of a workpiece, the method including:
        performing a learning cut on a test workpiece having a known geometry using the milling cutter mounted on a tool spindle in a climb milling mode;
        ascertaining a linear correlation between a quantity that is proportional to torque of a drive of the tool spindle and the deflection of the milling cutter normal to a surface of the test workpiece, the deflection being determined by comparing an actual contour of the test workpiece to a setpoint contour;
        storing the linear correlation for the milling cutter; and machining the workpiece by the milling cutter using the climb milling mode, and utilizing the stored linear correlation in order to compensate for the deflection of the milling cutter by applying a positional correction that is proportional to the quantity to a setpoint position of the axes of the machine tool.

13. The system according to claim 12, wherein the performing of the learning cut and/or the ascertaining of the linear correlation includes measuring the test workpiece with the aid of a touch probe.

14. The system according to claim 12, wherein the performing of the learning cut includes storing a rotational speed and/or a forward feed speed of the milling cutter used for the learning cut as a marginal condition, and wherein the machining of the workpiece includes monitoring the marginal condition.

15. The system according to claim 12, wherein the method includes detecting and/or forcing, in accordance with simulation and/or programming, a climb milling mode.

16. The system according to claim 12, wherein the quantity that is proportional to the torque of the drive of the tool spindle includes a load current of the drive ascertained during the learning cut.

17. The system according to claim 16, wherein a current flowing in the drive of the tool spindle during the learning cut, reduced by a no-load current and/or by a pilot-control current of the drive, is stored as the load current.

18. The system according to claim 16, wherein, in a field-oriented control of the drive, a torque-forming current of the drive, reduced by a no-load current and/or by a pilot-control current of the drive, is stored as the load current.

19. The system according to claim 12, wherein the method includes filtering the quantity to reduce interfering frequency components.

20. The system according to claim 19, wherein frequency components of the rotational speed of the milling cutter correspond to a tooth-engagement frequency and/or current noise.

21. The system according to claim 12, wherein the linear correlation is stored in the storing step as a linear slope in a tool table of the machine tool.

22. The system according to claim 12, wherein a pressure angle of the milling cutter during the machining of the workpiece is between 0° and 140°.

* * * * *